United States Patent
Salter et al.

(10) Patent No.: US 11,904,692 B2
(45) Date of Patent: Feb. 20, 2024

(54) DEPLOYABLE WORKSTATION AND VEHICLE

(71) Applicant: Ford Global Technologies, LLC, Dearborn, MI (US)

(72) Inventors: Stuart C. Salter, White Lake, MI (US); David Brian Glickman, Southfield, MI (US); Dustin Shedlarski, Commerce Township, MI (US); Micah Jones, Pleasant Ridge, MI (US); Hussein H. Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 17/839,733

(22) Filed: Jun. 14, 2022

(65) Prior Publication Data
US 2023/0398871 A1 Dec. 14, 2023

(51) Int. Cl.
*B60K 37/04* (2006.01)
*B62D 25/14* (2006.01)

(52) U.S. Cl.
CPC .............. *B60K 37/04* (2013.01); *B62D 25/14* (2013.01); *B60K 2370/67* (2019.05)

(58) Field of Classification Search
CPC ..... B60R 11/0235; B60N 3/002; B60K 37/04; B60K 2370/67; B62D 25/14
USPC .......................................................... 296/70
See application file for complete search history.

(56) References Cited

U.S. PATENT DOCUMENTS

| | | | | |
|---|---|---|---|---|
| 5,207,471 | A * | 5/1993 | Mutschler | B60R 11/0235 296/37.12 |
| 8,947,603 | B2 * | 2/2015 | Werth | B60R 11/0235 348/837 |
| 9,248,743 | B2 | 2/2016 | Enthaler et al. | |
| 10,583,740 | B2 | 3/2020 | Ory | |
| 10,647,264 | B2 * | 5/2020 | Forsgren | B60N 3/002 |
| 2009/0128307 | A1 | 5/2009 | Hentsch et al. | |
| 2009/0284474 | A1 * | 11/2009 | Komaki | G06F 3/1438 345/1.3 |
| 2014/0320382 | A1 | 10/2014 | Moussa et al. | |
| 2016/0121805 | A1 * | 5/2016 | Forsgren | B60N 3/002 348/837 |

(Continued)

FOREIGN PATENT DOCUMENTS

| | | |
|---|---|---|
| DE | 102018006580 A1 | 2/2019 |
| DE | 102020200409 A1 * | 7/2021 |

(Continued)

*Primary Examiner* — Pinel E Romain
(74) *Attorney, Agent, or Firm* — Vichit Chea; Price Heneveld LLP

(57) ABSTRACT

A workstation includes a dashboard for a vehicle having a recess on an upper surface, a first display screen extending from the dashboard, and a second display screen that is deployable between a stowed position within the recess in the dashboard and an extended deployed position aligned proximate to the first display screen. A control arm operatively couples the first display screen with the second display screen, wherein the control arm pivots about a pivot axis to deploy the second display screen proximate to the first display screen. The workstation has a deployable desk that pivots between a stowed position proximate to the dashboard and an extended deployed position forward of the dashboard, wherein the desk in the stowed position covers the second display screen.

18 Claims, 6 Drawing Sheets

(56) References Cited

U.S. PATENT DOCUMENTS

| | | | |
|---|---|---|---|
| 2016/0193923 A1* | 7/2016 | Kim | B60R 11/0235 |
| | | | 296/70 |
| 2023/0097623 A1* | 3/2023 | Harmon | B60N 3/002 |
| | | | 296/37.12 |
| 2023/0249550 A1* | 8/2023 | Ahn | B60K 35/00 |
| | | | 248/27.1 |

FOREIGN PATENT DOCUMENTS

| | | | |
|---|---|---|---|
| DE | 102020200409 A1 | | 7/2021 |
| WO | 0203712 A1 | | 1/2002 |
| WO | WO-2023072766 A1 | * | 5/2023 |

* cited by examiner

DEPLOYABLE WORKSTATION AND VEHICLE

FIELD OF THE DISCLOSURE

The present disclosure generally relates to deployable workstations, and more particularly relates to a deployable workstation having a display that is deployable in a vehicle.

BACKGROUND OF THE DISCLOSURE

Motor vehicles are commonly equipped with a cabin interior having passenger seating for transporting passengers. In some situations where passengers may want a work space in the vehicle, it would be desirable to provide for a workstation that may be deployed within the cabin interior.

SUMMARY OF THE DISCLOSURE

According to a first aspect of the present disclosure, a workstation is provided that includes a trim panel, a first display screen extending from the trim panel, and a second display screen that is deployable between a stowed position within the trim panel and an extended deployed position aligned proximate to the first display screen. The workstation also includes a control arm operatively coupling the first display screen with the second display screen, wherein the control arm pivots about a pivot axis to deploy the second display screen proximate to the first display screen to provide a deployed display screen.

Embodiments of the first aspect of the present disclosure can include any one or a combination of the following features:
 the trim panel is provided on a vehicle;
 the trim panel comprises a dashboard;
 the control arm pivots about the pivot axis to raise the second display screen above the first display screen;
 the first display screen moves towards the second display screen;
 the control arm is coupled to the second display screen to move the second display screen when the first display screen pivots;
 a deployable desk, wherein the deployable desk pivots between a stowed position proximate to the trim panel and an extended deployed position forward of the trim panel;
 the desk in the stowed position covers the second display screen; and
 the second display screen and the desk are stowed in a recess in the trim panel.

According to a second aspect of the present disclosure, a workstation is provided and includes a dashboard for a vehicle having a recess on an upper surface, a first display screen extending from the dashboard, and a second display screen that is deployable between a stowed position within the recess in the dashboard and an extended deployed position aligned proximate to the first display screen. The workstation also includes a control arm operatively coupling the first display screen with the second display screen, wherein the control arm pivots about a pivot axis to deploy the second display screen proximate to the first display screen, and a deployable desk that pivots between a stowed position proximate to the dashboard and an extended deployed position forward of the dashboard.

Embodiments of the second aspect of the present disclosure can include any one or a combination of the following features:
 the desk in the stowed position covers the second display screen;
 the desk is stowed in the recess in the dashboard;
 the first display screen moves towards the second display screen; and
 the control arm is coupled to the second display screen to move the second display screen when the first display screen pivots.

According to a third aspect of the present disclosure, a vehicle is provided and includes a cabin interior, a dashboard located near a front of the cabin interior, a first display screen extending from the dashboard, and a second display screen that is deployable between a stowed position within the dashboard and an extended deployed position aligned proximate to the first display screen. The vehicle also includes a control arm operatively coupling the first display screen with the second display screen, wherein the control arm pivots about a pivot axis to deploy the second display screen proximate to the first display screen.

Embodiments of the third aspect of the present disclosure can include any one or a combination of the following features:
 a deployable desk, wherein the deployable desk pivots between a stowed position proximate to the dashboard and an extended deployed position forward of the dashboard;
 the desk in the stowed position covers the second display screen;
 the second display screen and the desk are stowed in a recess in the dashboard;
 the control arm pivots about the pivot axis to raise the second display screen above the first display screen; and
 the first display screen moves towards the second display screen, and wherein the control arm is coupled to the second display screen to move the second display screen when the first display screen pivots.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
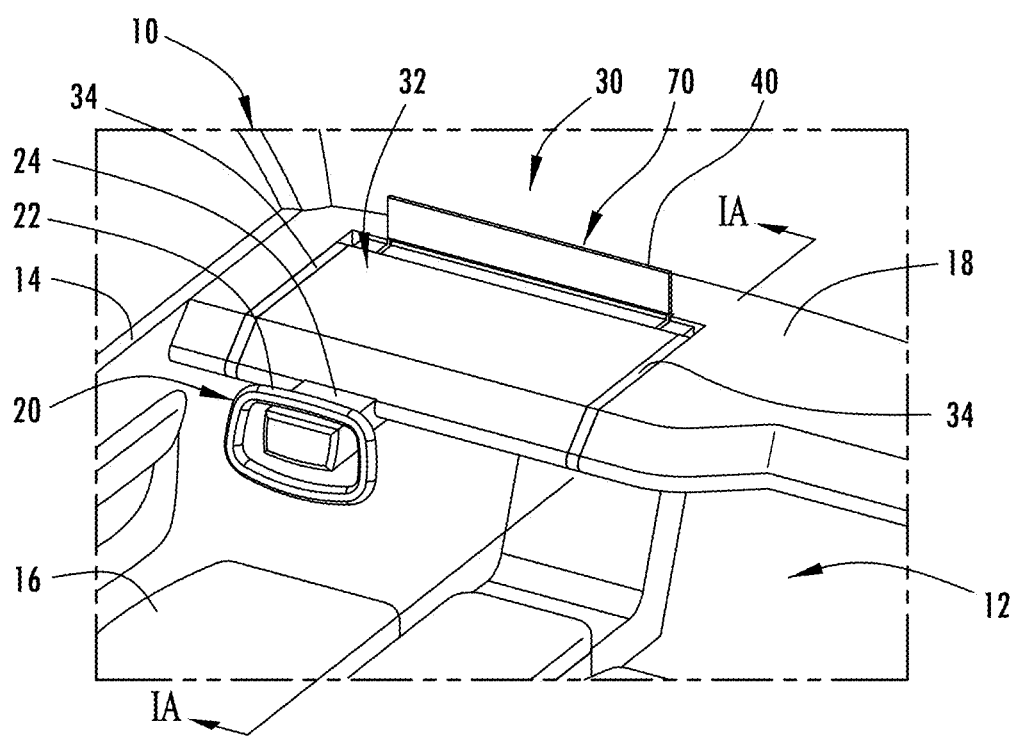
FIG. 1 is a perspective view of a cabin interior of a motor vehicle having a deployable workstation illustrated in the stowed position, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a deployable workstation and a vehicle having a deployable workstation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body that generally defines a cabin interior 12. The cabin interior 12 may contain various features and trim components within the vehicle body. The cabin interior 12 is shown having an arrangement of passenger seats including a driver seat 16 which may be configured as a bench or captain seats, for example. The vehicle 10 may also include additional seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The motor vehicle 10 is illustrated having the driver seat 16 located rearward of a front dashboard 18 that is generally defined by an interior panel generally located at or proximate to a front portion of the cabin interior 12 which is typically vehicle rearward of a front windshield. The dashboard 18 may include various trim panel components and instruments and may also be referred to as an instrument panel. Located vehicle forward the driver seat 16 and rearward of the dashboard 18 is a steering wheel 20 which has a steering rim 22 and a steering column 24 connected thereto. The steering wheel 20 may be engaged by a driver seated in seat 16 to steer vehicle wheels and hence the vehicle 10 as is readily apparent to one in the art. The steering wheel 20 may be a collapsible steering wheel, such as, for example, where the steering rim 22 may fold to a flat position, thereby lowering the top edge of the steering rim 22 when the vehicle 10 is not operated by the driver. In addition, the steering column 24 may collapse in a telescoping manner forward within the vehicle 10, such that the steering wheel 20 may be stowed when the vehicle 10 is not in use, for example.

The vehicle 10 further includes a plurality of side entry doors 14 located in the body of the vehicle 10 proximate to the lateral side of the seats. The doors 14 may pivot about a front hinge between an open position which allows access to the cabin interior 12 and a closed position which closes the cabin interior 12.

The vehicle 10 is shown equipped with a deployable workstation 30 shown located in the dashboard 18 generally forward of the driver seat 16 and above the steering column 24. The deployable workstation 30 includes a deployable desk 32 and a deployable display screen 70. The deployable workstation 30 is located in a position such that it can be deployed and utilized by a driver of the vehicle 10 when the vehicle 10 is not in operation or the vehicle 10 is not being driven. It should be appreciated that the vehicle 10 may be locked-out in park and not moving when the deployable workstation 30 is deployed. It is anticipated that technology and the regulatory framework may evolve in the future to where using the workstation 30 in a moving vehicle becomes safe and permissible. It should also be appreciated that the deployable workstation 30 may be located at other locations on the vehicle 10, such as proximate to a passenger seat to allow an occupant seated in the passenger seat to utilize the workstation 30.

Figure 1A:
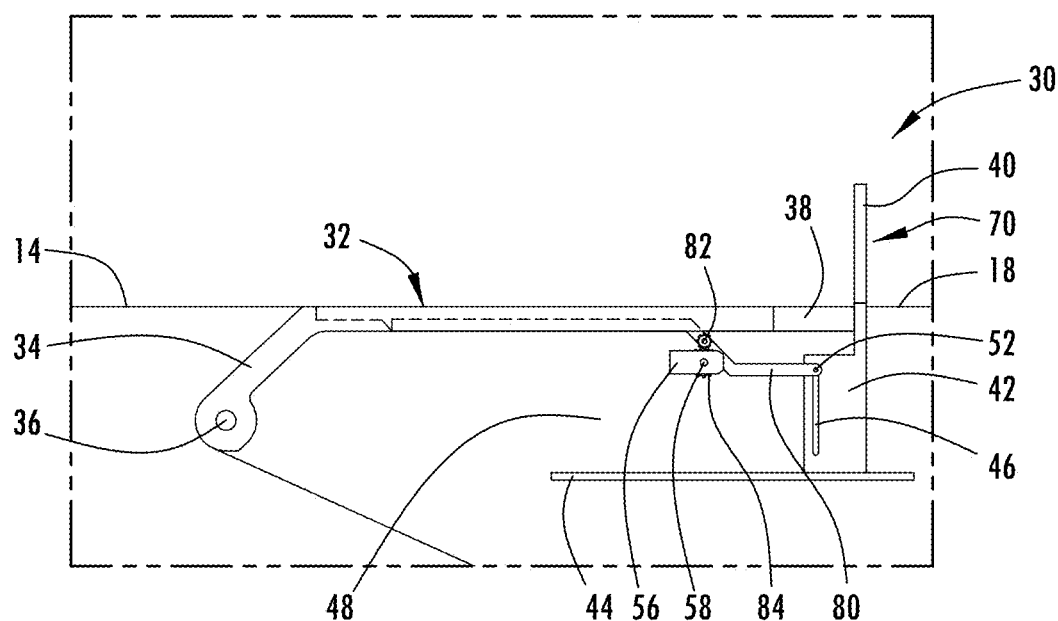
FIG. 1A is a cross-sectional view taken through line IA-IA of FIG. 1 further illustrating the workstation in the stowed position.

Referring to FIGS. 1-3A, the deployment of the deployable desk 32 between the stowed and deployed positions is illustrated. As seen in FIGS. 1 and 1A, the desk 32 is stowable within a recess 38 in the top surface of the dashboard 18 in the stowed position. The desk 32 is shown in the stowed position in FIGS. 1 and 1A having a top surface that conforms to the top surface of the dashboard 18 and may include a covering similar to that of the dashboard such as a plastic or vinyl cover layer. The desk 32 has a work surface 90 on the bottom side which, when fully deployed, will be rotated to the top side and may be utilized as a work desk. The desk 32 has support arms 34 on opposite lateral sides that are connected at one end to pivot pins 36 in the dashboard 18 that allow the desk 32 to pivot about a lateral pivot axis by approximately 1800 between the fully stowed position shown in FIG. 1 and the fully deployed position shown in FIG. 3.

Figure 2:
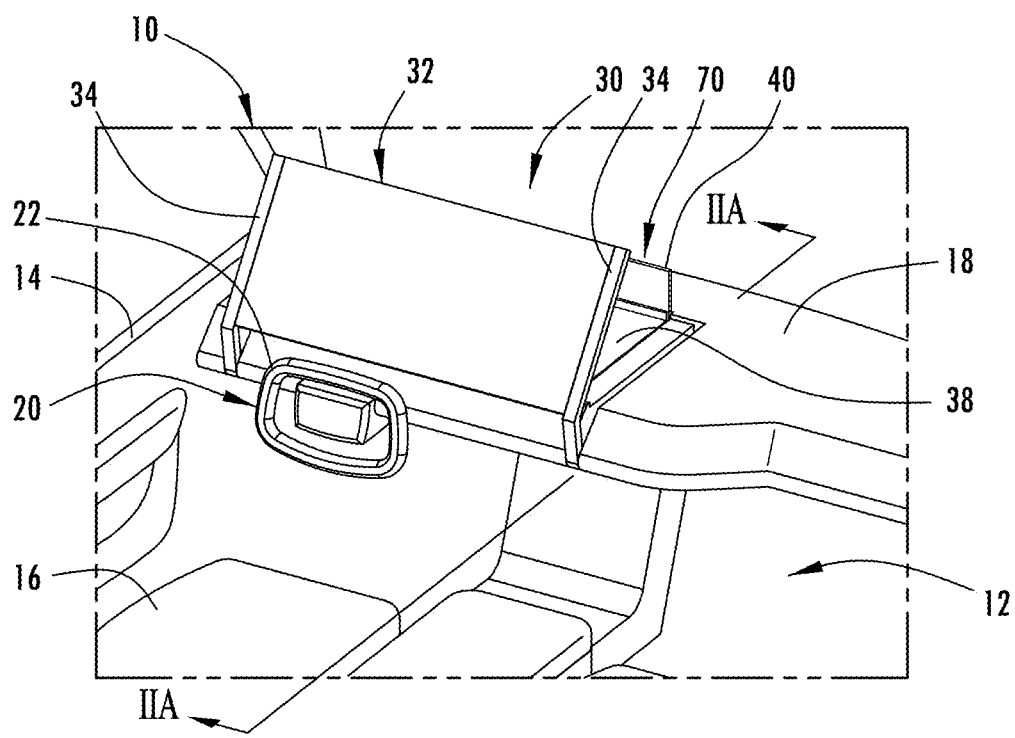
FIG. 2 is a perspective view of the cabin interior of the motor vehicle showing a deployable desk in a partially deployed position.
Figure 2A:
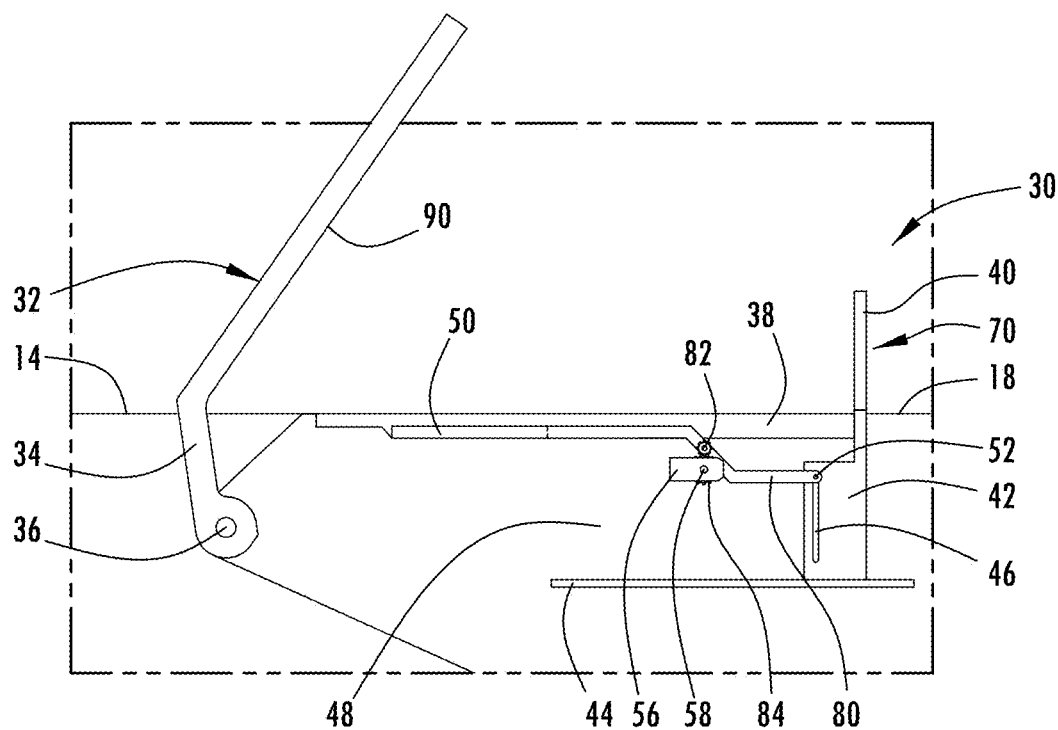
FIG. 2A is a cross-sectional view taken through line IIA-IIA of FIG. 2 further illustrating the desk in the partially deployed position.
Figure 3:
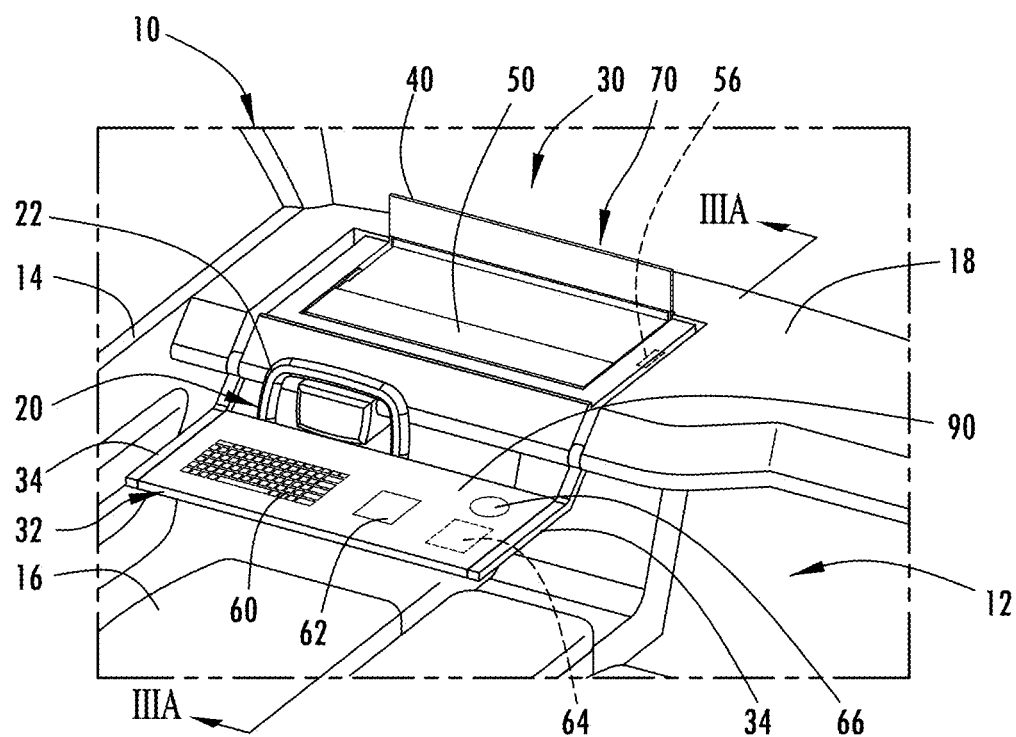
FIG. 3 is a perspective view of the cabin interior of the motor vehicle showing the deployable desk in a fully deployed position.
Figure 3A:
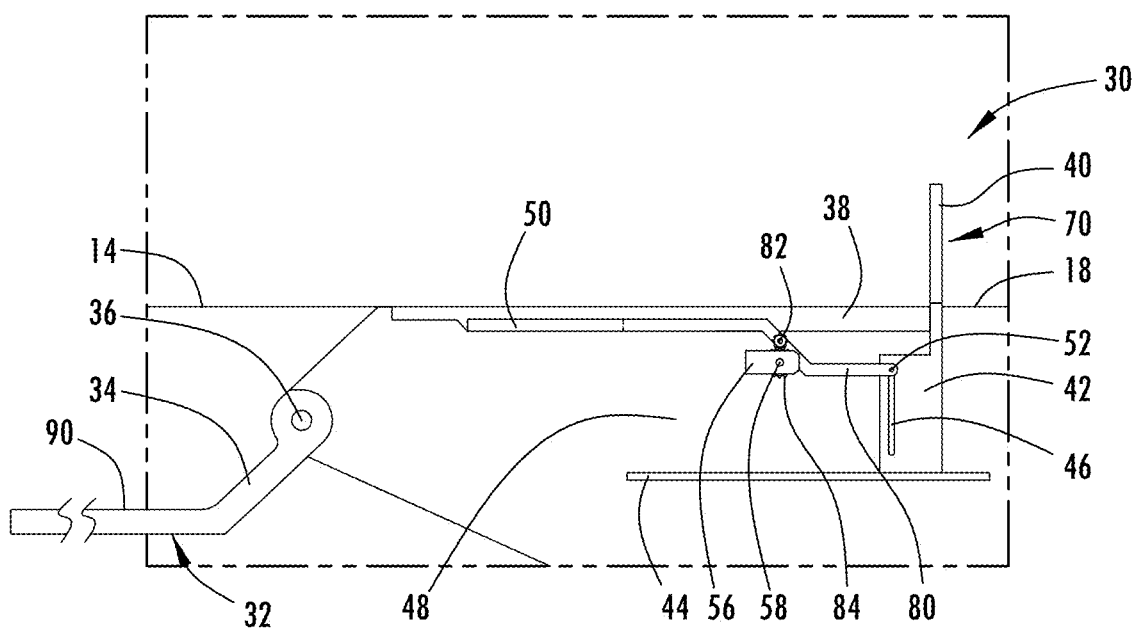
FIG. 3A is a cross-sectional view taken through line IIIA-IIIA of FIG. 3 further illustrating the desk in the fully deployed position.

The desk 32 may pivot from the fully stowed position shown in FIG. 1 to a partially deployed position shown in FIG. 2 as the support arms 34 pivot about pivot pins 36. In doing so, the desk 32 is rotated or pivoted upward and vehicle rearward over the steering wheel 20 which may be configured in a compact stowed position, such that the steering column 24 is positioned vehicle forward and downward from the use position. In addition, the steering rim 22 may be compacted such as pivoted to a more compact position. As the desk 32 continues to pivot upward and vehicle rearward, the desk 32 reaches to a horizontal deployed position at the end of travel which is vehicle rearward of the steering wheel 20 as shown in FIG. 3. In this deployed position, the desk 32 has the work surface 90 on the upper side which a user may utilize. It should be appreciated that the vehicle 10 may be locked-out in park and not moving when the deployable desk 32 is deployed. It is anticipated that technology and the regulatory framework may evolve in the future to where using the desk 32 in a moving vehicle becomes safe and permissible.

The deployable desk 32 may include a keyboard 60, such as a capacitive keyboard having capacitive sensors or other proximity sensors, formed on the upper work surface 90 as shown in FIG. 3. The capacitive keyboard 60 may include an array of proximity sensors having various keypad regions defining the characters of the keyboard in this example. It should be appreciated that the keyboard 60 may include other proximity sensors, or may employ mechanical push-buttons, according to other examples. The keyboard 60 may be operatively coupled to the deployable display screen 70 via wired or wireless communication to communicate therewith. The desk 32 may further include an inductive charger 64 integrated into the work surface 90 for charging one or more rechargeable batteries and battery-operated devices. Further, the work surface 90 may include a mouse pad or input pad that employs capacitive or other proximity sensors to provide a user input that may communicate with the deployable display screen 70. Further, the work surface may include a heated pad 66 for holding a drink that may be heated. It may be appreciated that other components may be located on the work surface 90 of the desk 32.

The deployable desk 32 may be actuated manually by a user engaging the proximal end of the desk 32 and lifting and pulling with force to rotate the desk 32 upward and vehicle rearward from the stowed position to the fully deployed position. The desk 32 may further be returned to the stowed position by pushing with force the desk 32 upward and vehicle forward back into the fully stowed position within recess 38. In other embodiments, it is contemplated that the desk 32 may be deployed with the use of an actuator, such as an electric motor or may include a spring-assist.

The deployable workstation 30 includes a deployable display screen 70 that may be fully deployed when the desk 32 is in the deployed position. The display screen 70 includes a first or lower display screen 40 and a deployable second or upper display screen 50 that move into position to fit together to form the larger full-size display screen 70. The lower display screen 40 is shown in FIG. 3, according to a first embodiment in a vertical extended position extending from an underlying support base 42 within a compartment 48 of the dashboard 18. The support base 42 is movable on a track 44 longitudinally in the vehicle forward and rearward directions. In the stowed position of the display screen 70, the lower display screen 40 extends above the dashboard at a forwardmost position. The support base 42 has a vertical slot 46 that engages a pin 52 on a control arm 80.

Figure 4:
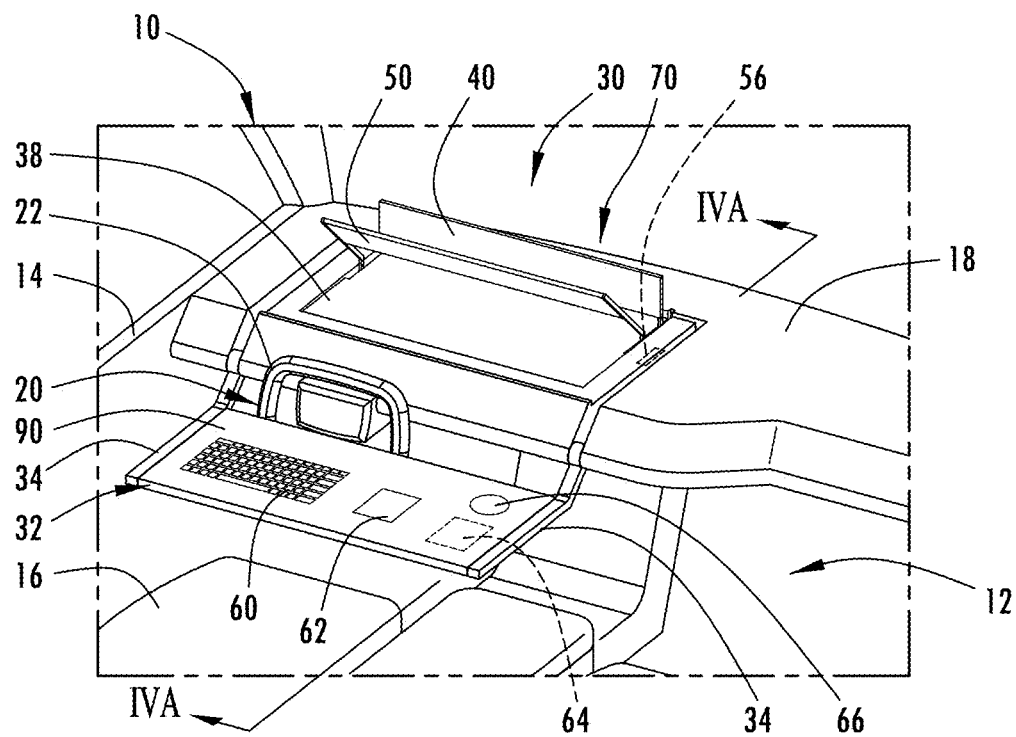
FIG. 4 is a perspective view of the cabin interior of the motor vehicle showing a deployable display screen in a partially deployed position, according to a first embodiment.
Figure 4A:
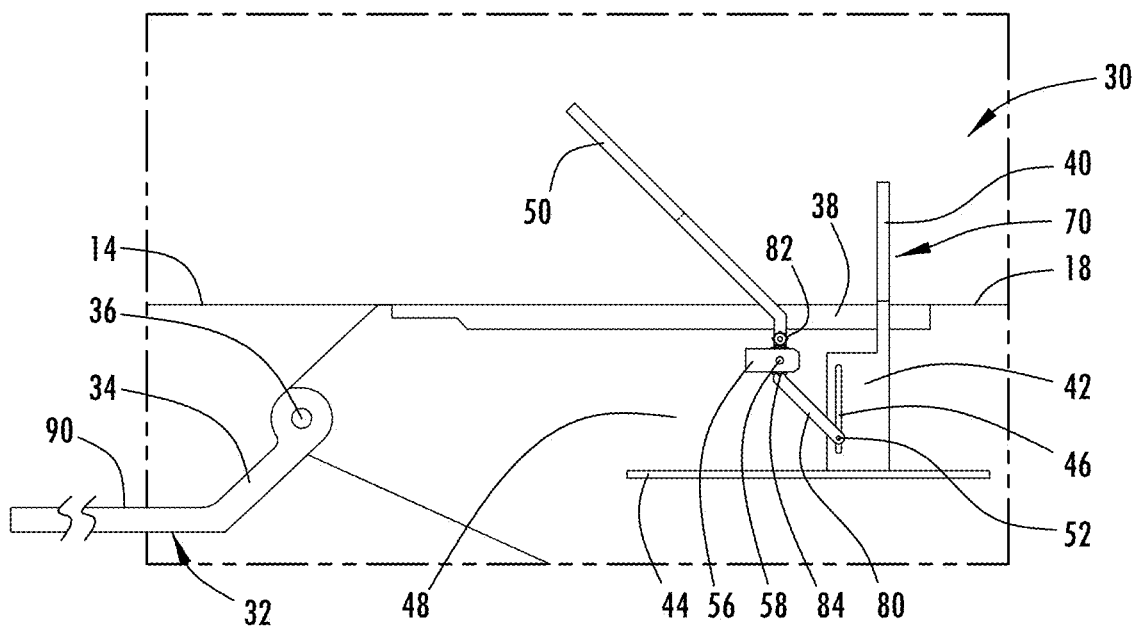
FIG. 4A is a cross-sectional view taken through line IVA-IVA of FIG. 4 further illustrating the display screen in the partially deployed position.
Figure 5:
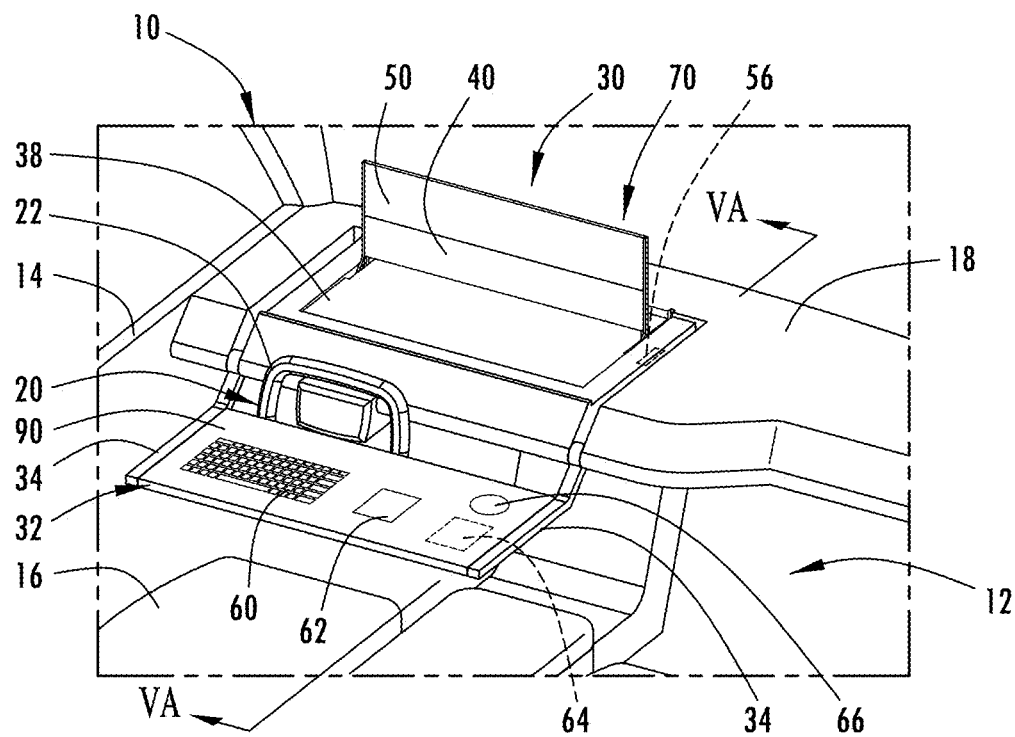
FIG. 5 is a perspective view of the cabin interior of the motor vehicle further illustrating the display screen in the fully deployed position.
Figure 5A:
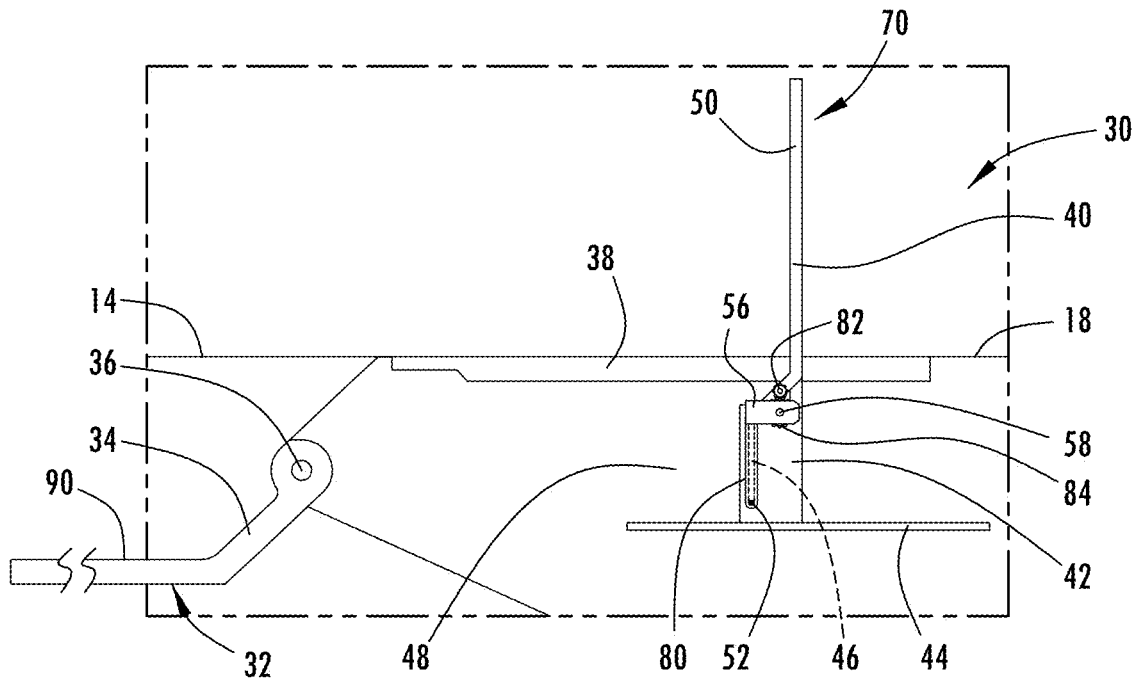
FIG. 5A is a cross-sectional view taken through line VA-VA of FIG. 5 further illustrating the display screen in the fully deployed position.

The upper display screen 50 may be covered by desk 32 in the stowed position. When the desk 32 is in the deployed position, the upper display screen 50 may be moved to the deployed position. The upper display screen 50 is supported by the control arm 80 and includes a pivot connection 82 to allow the upper display screen 50 to move from the stowed position in recess 38 shown in FIG. 3A to a vertical deployed position shown in FIG. 5A. As the control arm 80 is rotated clockwise, the upper display screen 50 pivots clockwise from a horizontal position to a vertical position aligned with the lower display screen 40. At the same time that the upper display screen 50 is raised, the lower display screen 40 is moved by control arm 80 vehicle rearward by sliding or moving the base 42 on track 44 in the rearward direction. As a result, the upper display screen 50 may be deployed as shown in FIGS. 4 and 5 to a partially deployed position and then to a fully deployed position shown in FIG. 5. In the fully deployed position, the user may utilize the full deployed display screen 70 which extends vertically higher and vehicle rearward such that it is closer to the user seated in the seat 16. The full deployed display screen 70 provides a single screen made up of the combination of the upper and lower display screens 50 and 40 such that images may be viewed on the entirety of the display screen 70. The upper and lower display screens 50 and 40 may include displays such as LCD and LED displays.

To deploy the display screen 70, the control arm 80 may be actuated manually by a user engaging the proximal end of the upper display screen 50 and pivoting the control arm 80 clockwise to the fully deployed vertical position. To stow the display screen 70, the user may pull the upper display screen 50 rearward and downward back to the stowed position. In one embodiment as shown, the control arm 80 may be actuated via a motor 56 having a motor shaft 58 which, rotates a wheel 84 having teeth. The teeth on wheel 84 are matingly engaged with teeth on the pivot axis 82 which may be configured as a wheel. As such, the motor 56 may activate the wheel 84 to drive the control arm 80 and the upper display screen 50 and lower display screen 40 between the stowed and deployed positions in response to a user input. It should be appreciated that the vehicle 10 may be locked-out in park and not moving when the deployable full display screen 70 is deployed. It is anticipated that technology and the regulatory framework may evolve in the future to where using the fully display screen 70 in a moving vehicle becomes safe and permissible.

Figure 6A:
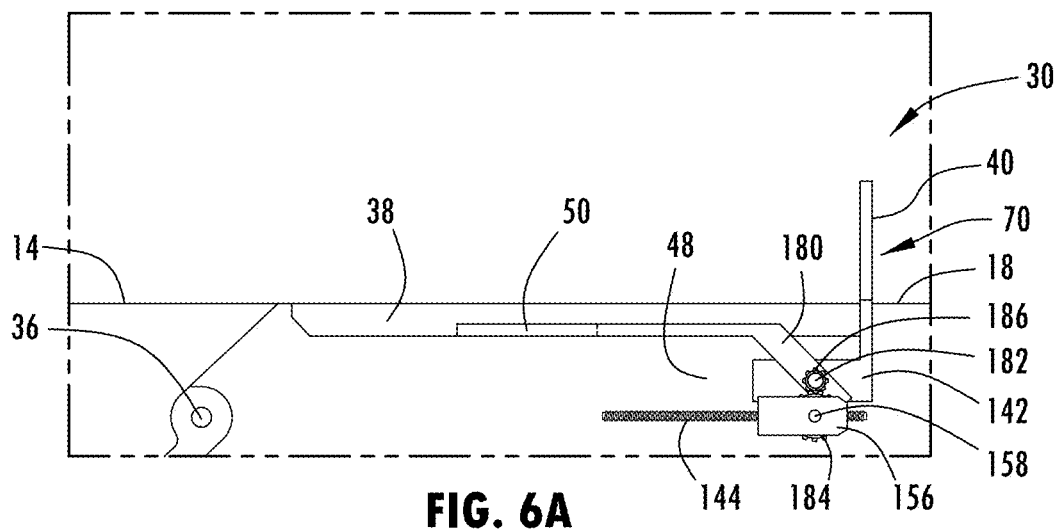
FIG. 6A is a cross-sectional view taken through line IIIA-IIIA of FIG. 3 illustrating a stowed display screen according to a second embodiment.
Figure 6B:
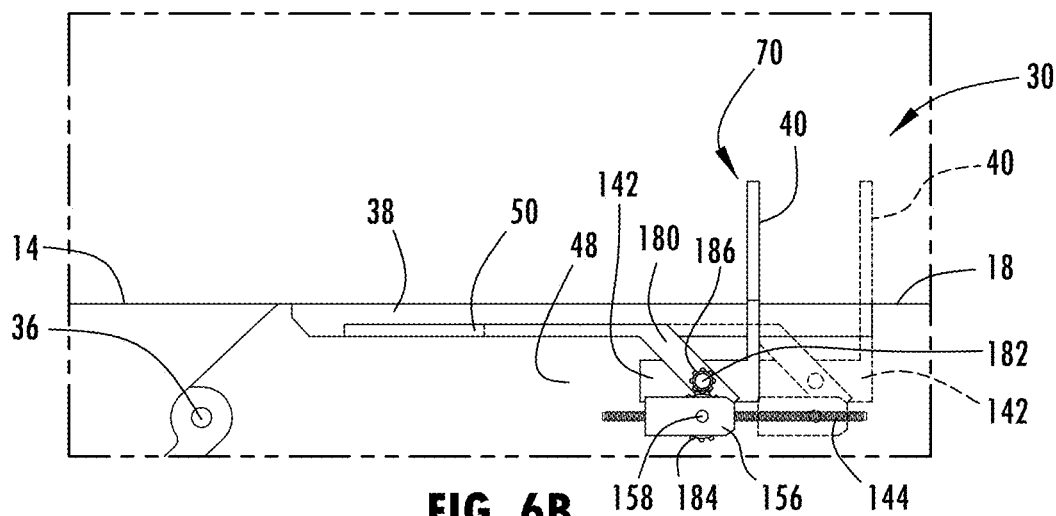
FIG. 6B is a cross-sectional view taken through line IVA-IVA of FIG. 4 showing the partially deployed display screen, according to the second embodiment.
Figure 6C:
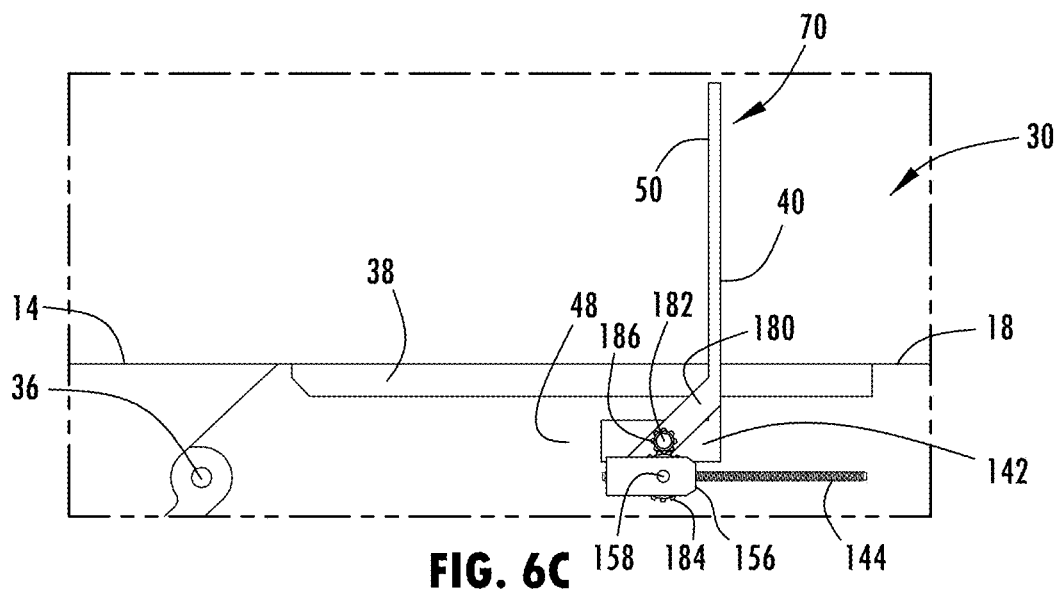
FIG. 6C is a cross-sectional view taken through line VA-VA of FIG. 5 illustrating the deployable display screen in a fully deployed position, according to the second embodiment.

Referring to FIGS. 6A-6C, the deployable workstation 30 is shown configured with a deployable display screen 70 that is actuatable via a control arm 180, according to a second embodiment. In this embodiment, the upper display screen 50 may be stowed within recess 38 and moved to the deployed position when the desk 32 is in the fully deployed position. The control arm 180 is connected to support base 142 which supports the lower display screen 40. In this embodiment, the support base 142 may be actuated vehicle rearward to move the lower display screen 40 on track 144 vehicle rearward into a deployed position closer to a user as shown in FIG. 6B. Movement of the support base 142 and lower display screen 40 may be enabled by use of a motor using a linear screw drive, for example, or may occur manually with force applied by a user. The upper display screen 50 may be rotated from the stowed position shown in FIG. 6A to the deployed position shown in FIG. 6C by rotating the control arm 180 clockwise until the upper display screen 50 is vertical and aligned with the lower display screen 40 such that the full display screen 70 is provided. Actuation of the control arm 180 may be achieved with a motor 156 having an output shaft 158 connected to a wheel 184 having teeth that drives teeth on a wheel 186 defining a pivot axis 182 of the control arm 180. Alternately, the upper display screen 50 may be moved between the stowed and deployed positions manually by a user applying a force.

Accordingly, a vehicle 10 is provided with a deployable workstation 30 having a deployable desk 32 and a deployable display screen 70 operatively housed within an interior panel, such as a dashboard 18. Both the desk 32 and an upper display screen 50 of the display screen 70 may be pivoted between stowed and deployed positions. As such, a user may deploy the desk 32 to provide a work surface when needed and may further deploy the display screen 70 to provide a workstation in the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A workstation comprising:
  a trim panel;
  a first display screen extending from the trim panel;
  a second display screen that is deployable between a stowed position within the trim panel and an extended deployed position aligned proximate to the first display screen; and
  a control arm operatively coupling the first display screen with the second display screen, wherein the control arm pivots about a pivot axis to deploy the second display screen proximate to the first display screen to provide a deployed display screen, wherein the control arm pivots about the pivot axis to raise the second display screen above the first display screen, and wherein the first display screen moves towards the second display screen.

2. The workstation of claim 1, wherein the trim panel is provided on a vehicle.

3. The workstation of claim 2, wherein the trim panel comprises a dashboard.

4. The workstation of claim 1, wherein the control arm is coupled to the second display screen to move the second display screen when the first display screen pivots.

5. The workstation of claim 1 further comprising a deployable desk, wherein the deployable desk pivots between a stowed position proximate to the trim panel and an extended deployed position forward of the trim panel.

6. The workstation of claim 5, wherein the desk in the stowed position covers the second display screen.

7. The workstation of claim 6, wherein the second display screen and the desk are stowed in a recess in the trim panel.

8. A workstation comprising:
  a dashboard for a vehicle having a recess on an upper surface;
  a first display screen extending from the dashboard;
  a second display screen that is deployable between a stowed position within the recess in the dashboard and an extended deployed position aligned proximate to the first display screen;
  a control arm operatively coupling the first display screen with the second display screen, wherein the control arm pivots about a pivot axis to deploy the second display screen proximate to the first display screen; and a deployable desk that pivots between a stowed position proximate to the dashboard and an extended deployed position forward of the dashboard.

9. The workstation of claim 8, wherein the desk in the stowed position covers the second display screen.

10. The workstation of claim 9, wherein the desk is stowed in the recess in the dashboard.

11. The workstation of claim 8, wherein the first display screen moves towards the second display screen.

12. The workstation of claim 11, wherein the control arm is coupled to the second display screen to move the second display screen when the first display screen pivots.

13. A vehicle comprising:
a cabin interior;
a dashboard located near a front of the cabin interior;
a first display screen extending from the dashboard;
a second display screen that is deployable between a stowed position within the dashboard and an extended deployed position aligned proximate to the first display screen; and a control arm operatively coupling the first display screen with the second display screen, wherein the control arm pivots about a pivot axis to deploy the second display screen proximate to the first display screen.

14. The vehicle of claim 13 further comprising a deployable desk, wherein the deployable desk pivots between a stowed position proximate to the dashboard and an extended deployed position forward of the dashboard.

15. The vehicle of claim 14, wherein the desk in the stowed position covers the second display screen.

16. The vehicle of claim 15, wherein the second display screen and the desk are stowed in a recess in the dashboard.

17. The vehicle of claim 13, wherein the control arm pivots about the pivot axis to raise the second display screen above the first display screen.

18. The vehicle of claim 17, wherein the first display screen moves towards the second display screen, and wherein the control arm is coupled to the second display screen to move the second display screen when the first display screen pivots.

* * * * *